United States Patent
Jaganmohan et al.

(10) Patent No.: US 10,164,990 B2
(45) Date of Patent: Dec. 25, 2018

(54) SECURITY TEST TOOL

(71) Applicant: Bank of America Corporation, Charlotte, NC (US)

(72) Inventors: Karthik Jaganmohan, Newark, DE (US); Indrajit Biswas, Newark, DE (US)

(73) Assignee: Bank of America Corporation, Charlotte, NC (US)

( * ) Notice: Subject to any disclaimer, the term of this patent is extended or adjusted under 35 U.S.C. 154(b) by 195 days.

(21) Appl. No.: 15/068,177

(22) Filed: Mar. 11, 2016

(65) Prior Publication Data
US 2017/0264625 A1   Sep. 14, 2017

(51) Int. Cl.
| | |
|---|---|
| H04L 29/06 | (2006.01) |
| G06F 17/30 | (2006.01) |
| G06F 21/55 | (2013.01) |
| G06F 21/60 | (2013.01) |
| G06F 21/57 | (2013.01) |

(52) U.S. Cl.
CPC .... *H04L 63/1425* (2013.01); *G06F 17/30371* (2013.01); *G06F 21/552* (2013.01); *G06F 21/57* (2013.01); *G06F 21/604* (2013.01); *H04L 63/1408* (2013.01); *H04L 63/1416* (2013.01); *H04L 63/1433* (2013.01)

(58) Field of Classification Search
CPC .............. H04L 63/1408; H04L 63/1416; H04L 63/1425; G06F 21/552; G06F 21/604
See application file for complete search history.

(56) References Cited

U.S. PATENT DOCUMENTS

| | | | |
|---|---|---|---|
| 6,385,604 B1 | 5/2002 | Bakalash | |
| 6,697,818 B2 | 2/2004 | Li | |
| 9,462,010 B1 * | 10/2016 | Stevenson | ........... H04L 63/1433 |
| 9,684,686 B1 * | 6/2017 | Morley | ............. G06F 17/30312 |
| 9,942,254 B1 * | 4/2018 | Averbuch | ............ H04L 63/1425 |

(Continued)

OTHER PUBLICATIONS

Huang, Jian-hua; Zhang, Man-qi; Jiang, Yuan-long; "The design and implement of the centralized log gathering and analysis system", International Conference on Computer Science and Automation Engineering (CSAE), IEEE, May 25-27, 2012, pp. 268-273.*

(Continued)

*Primary Examiner* — Victor Lesniewski
(74) *Attorney, Agent, or Firm* — Michael A. Springs

(57) ABSTRACT

A test tool includes a connection engine, a transformation engine, a validation engine, and a messaging engine. The connection engine connects to a first non-relational database, a second non-relational database, and a server. The transformation engine receives first and second messages from the first and second non-relational databases and transforms the second message into a JavaScript Object Notation message. The validation engine compares the first message with a server log stored on the server to determine whether information in the first message matches information in the server log and compares the JavaScript Object Notation message with the server log to determine whether information in the second message matches information in the server log. The messaging engine communicates a message indicating that information in the first message and the second message match information in the server log.

9 Claims, 3 Drawing Sheets

(56) References Cited

U.S. PATENT DOCUMENTS

| | | | |
|---|---|---|---|
| 2002/0078382 A1* | 6/2002 | Sheikh | H04L 41/0866 |
| | | | 726/22 |
| 2005/0192962 A1 | 9/2005 | Furrer | |
| 2007/0143842 A1* | 6/2007 | Turner | G06F 21/552 |
| | | | 726/22 |
| 2008/0184058 A1* | 7/2008 | McDermott | G06F 21/552 |
| | | | 714/2 |
| 2008/0229419 A1* | 9/2008 | Holostov | G06F 21/564 |
| | | | 726/24 |
| 2009/0157574 A1* | 6/2009 | Lee | G06F 21/552 |
| | | | 706/12 |
| 2009/0198707 A1* | 8/2009 | Rohner | H04L 63/1408 |
| 2012/0005542 A1* | 1/2012 | Petersen | G06F 11/0709 |
| | | | 714/48 |
| 2012/0191660 A1* | 7/2012 | Hoog | G06F 21/552 |
| | | | 707/661 |
| 2013/0006949 A1* | 1/2013 | Essawi | G06F 21/552 |
| | | | 707/703 |
| 2013/0067575 A1* | 3/2013 | Zuk | H04L 63/1425 |
| | | | 726/23 |
| 2013/0117294 A1* | 5/2013 | Arao | G06F 21/552 |
| | | | 707/758 |
| 2015/0088868 A1* | 3/2015 | Jordan | G06F 17/30554 |
| | | | 707/722 |
| 2016/0014146 A1* | 1/2016 | Nakata | H04L 12/6418 |
| | | | 726/12 |
| 2016/0301709 A1* | 10/2016 | Hassanzadeh | H04L 63/1433 |
| 2016/0301732 A1* | 10/2016 | Moretto | H04L 43/50 |
| 2017/0026395 A1* | 1/2017 | Mumcuoglu | G06F 21/552 |
| 2017/0178025 A1* | 6/2017 | Thomas | G06N 99/005 |
| 2017/0178026 A1* | 6/2017 | Thomas | G06N 99/005 |
| 2017/0300302 A1* | 10/2017 | Yang | G06F 8/34 |

OTHER PUBLICATIONS

Wool, Avishai; "A Quantitative Study of Firewall Configuration Errors", Computer, IEEE, vol. 37, Issue 6, Jun. 21, 2004, pp. 62-67.*

* cited by examiner

SECURITY TEST TOOL

TECHNICAL FIELD

This disclosure relates generally to a system for verifying network security.

BACKGROUND

Network security should be maintained in order to prevent intrusions that can cripple the network. One step in ensuring network security is logging detected activities and tracking the source of those activities.

SUMMARY OF THE DISCLOSURE

According to one embodiment, a test tool includes a connection engine, a transformation engine, a validation engine, and a messaging engine. The connection engine connects to a first non-relational database, a second non-relational database, and a server. The transformation engine receives first and second messages from the first and second non-relational databases and transforms the second message into a JavaScript Object Notation message. The validation engine compares the first message with a server log stored on the server to determine whether information in the first message matches information in the server log and compares the second JavaScript Object Notation message with the server log to determine whether information in the second message matches information in the server log. The messaging engine communicates a message indicating that information in the first message and the second message match information in the server log.

According to another embodiment, a method includes connecting to a first non-relational database, a second non-relational database, and a server and receiving a first message from the first non-relational database. The method also includes receiving a second message from the second non-relational database. The method further includes transforming the second message into a JavaScript Object Notation message, comparing the first message with a server log stored on the server to determine whether information in the first message matches information in the server log, and comparing the JavaScript Object Notation message with the server log to determine whether information in the second message matches information in the server log. The method also includes communicating a message indicating that information in the first message and the second message match information in the server log.

According to another embodiment, a system includes a transformation engine, a validation engine, and a messaging engine. The transformation engine receives first and second messages from first and second non-relational databases and transforms the second message into a JavaScript Object Notation message. The validation engine compares the first message with a server log to determine whether information in the first message matches information in the server log and compares the JavaScript Object Notation message with the server log to determine whether information in the second message matches information in the server log. The messaging engine communicates a message indicating that information in the first message and the second message match information in the server log.

Certain embodiments provide one or more technical advantages. For example, an embodiment improves the security of a network by ensuring that proper security events are detected. As another example, an embodiment improves the security of a network by ensuring that proper logging of security events occurs. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
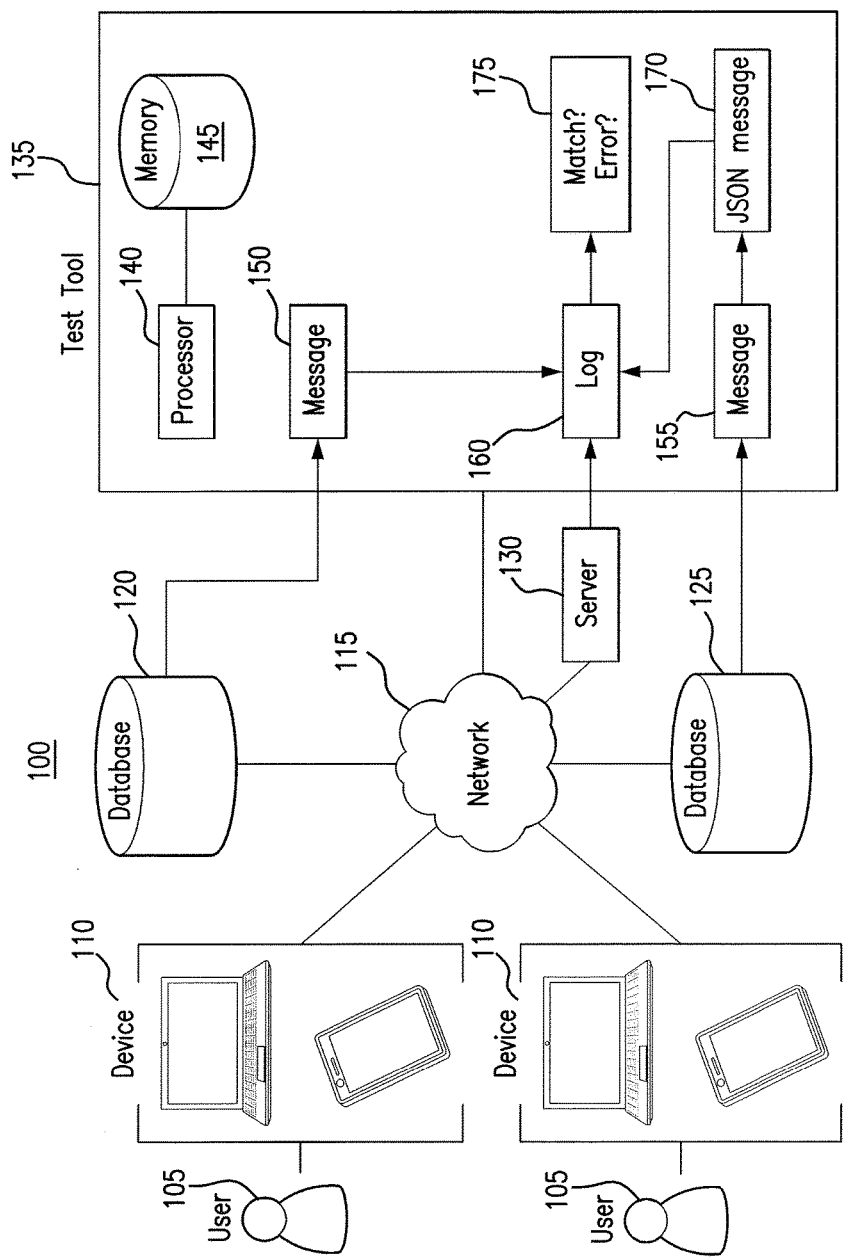
FIG. 1 illustrates a system for testing the security of a network.
Figure 2:
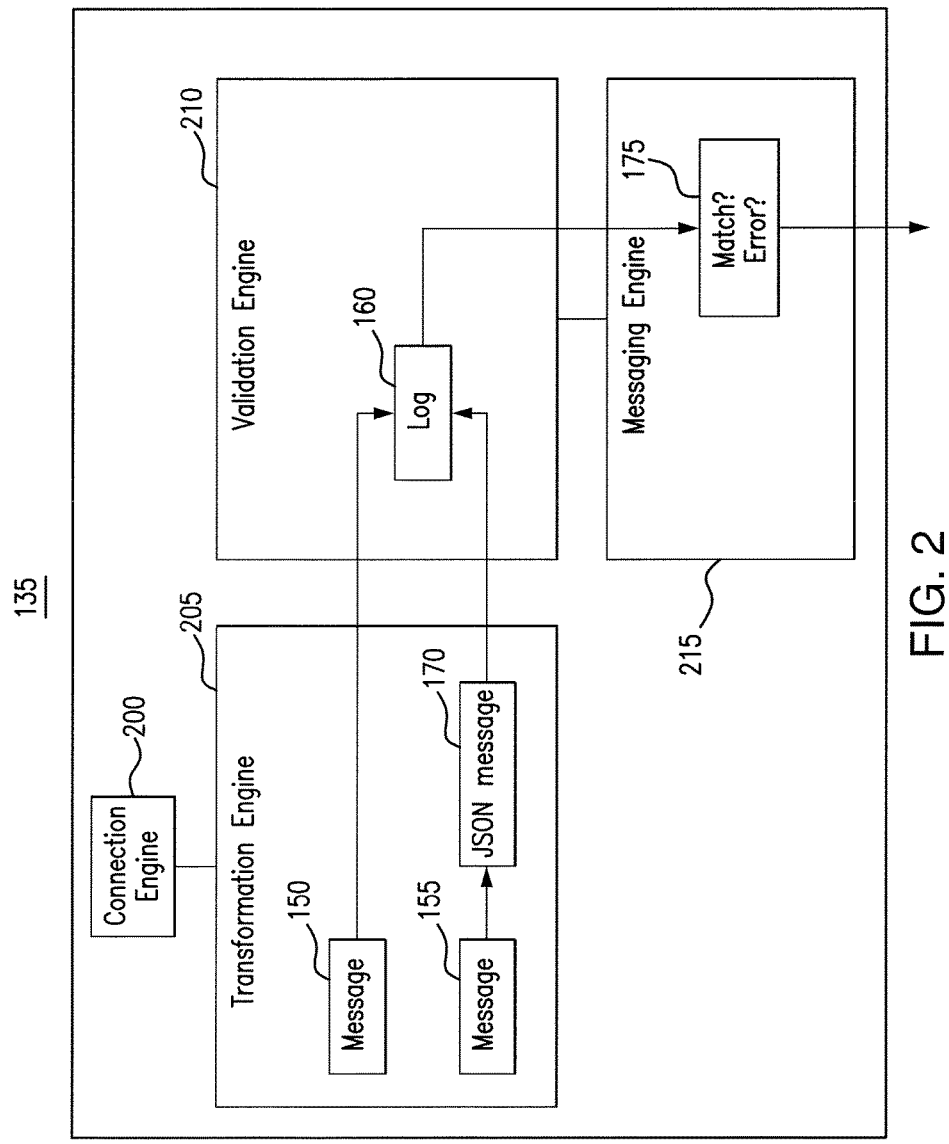
FIG. 2 illustrates the test tool of the system of FIG. 1.
Figure 3:
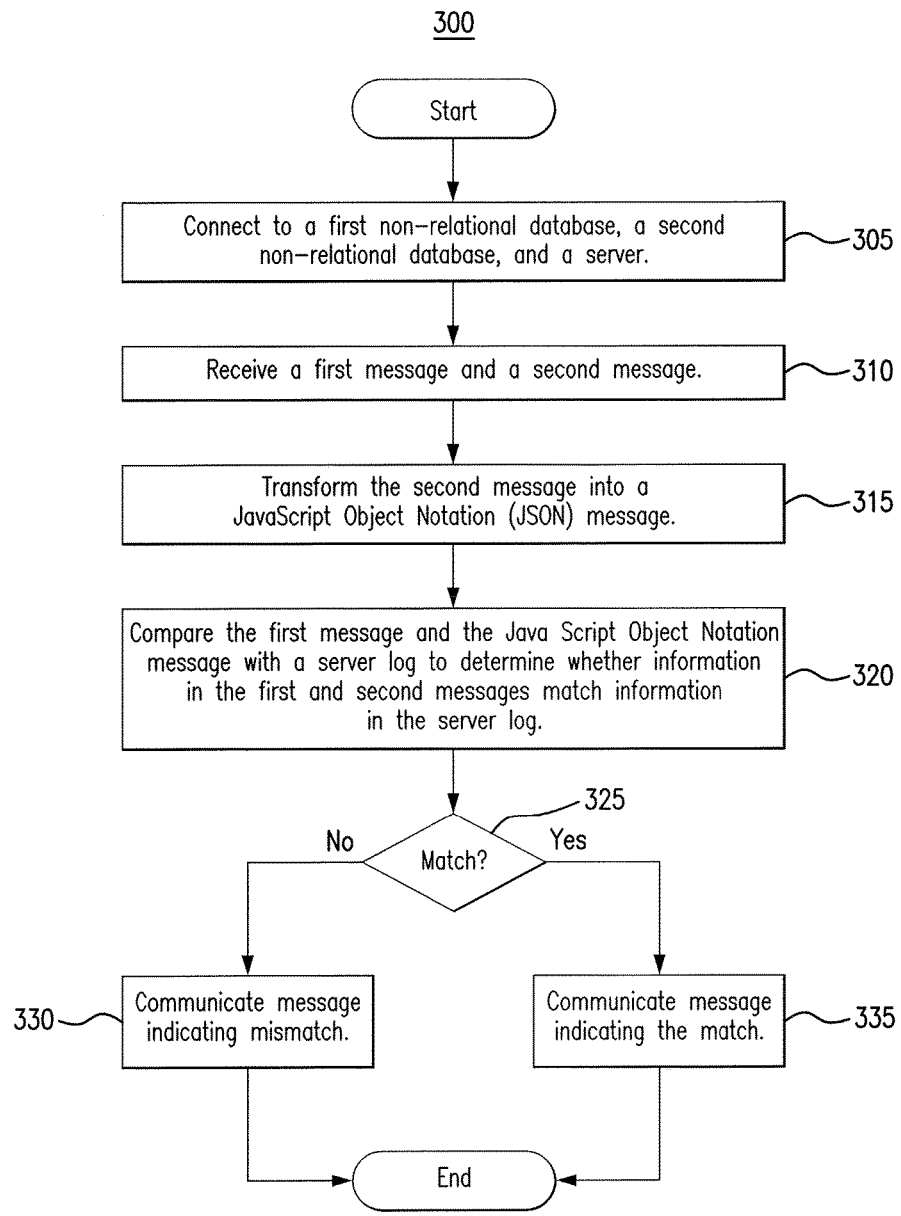
FIG. 3 is a flowchart illustrating a method for testing the security of a network using the system of FIG. 1.

Embodiments of the present disclosure and its advantages are best understood by referring to FIGS. 1 through 3 of the drawings, like numerals being used for like and corresponding parts of the various drawings.

Network security should be maintained in order to prevent intrusions that can cripple the network. For example, when user credentials are stolen, hackers may access the network using the stolen credentials. Such access exposes the network to malware and theft. As another example, the network may be improperly accessed through social engineering attempts. When the social engineering attempts are successful, access to the network may be improperly granted. This again exposes the network to malware and/or theft.

Many tools for improving and/or maintaining network security do so by detecting and tracking security events. For example, the tool can detect improper attempts to access the network such as by a hacker. As another example, the tool can detect when access has been denied. As yet another example, the tool can detect when a fraudulent request and/or activity has occurred. Most tools track these security events by logging and analyzing these events. When a security tool is not functioning properly, the log of detected security events may include an incorrect number of entries. For example, the tool may fail to detect a security event and therefore fail to create an entry in the log. As another example, the tool may detect a security event but fail to log the event. Therefore, ensuring that the tool works properly is important to maintaining network security.

This disclosure contemplates a test tool that checks whether the network security tool is functioning properly. The tool receives messages from databases that store detected security events. The test tool then converts these messages into JavaScript object notation messages. The test tool then compares these JavaScript object notation messages with entries in a log. Based on these comparisons the test tool determines whether the network security tool is functioning properly. The test tool will be described in more detail using FIGS. 1 through 3. FIG. 1 will describe the test tool generally. FIGS. 2 and 3 will describe the test tool in more detail.

FIG. 1 illustrates a system 100 for testing the security of a network 115. As illustrated in FIG. 1, system 100 includes one or more users 105, one or more devices 110, a network 115, a first database 120, a second database 125, a server 130, and a test tool 135. In particular embodiments, by using test tool 135, the security of network 115 is improved by verifying the operations of server 130.

Devices 110 allow users 105 to interact with other components of system 100. For example, user 105 may use device 110 to use test tool 135. This disclosure contemplates device(s) 110 being any appropriate device that can communicate over network 115. For example, device(s) 110 may be a computer, a laptop, a wireless or cellular telephone, an electronic notebook, a personal digital assistant, a tablet, a server, a mainframe, or any other device capable of receiving, processing, storing, and/or communicating information with other components of system 100. Device(s) 110 may also include a user interface, such as a display, a microphone, keypad, or other appropriate terminal equipment usable by a user. In some embodiments, an application executed by device(s) 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

First database 120, second database 125, and server 130 may operate to maintain and/or ensure the security of network 115. For example, server 130 may track events and/or actions that occur over network 115 to detect whether any of these events or actions pose a security risk to network 115. For example, server 130 may monitor network 115 to detect any hack and/or intrusion attempts on network 115. As another example, server 130 may monitor transactions that occur over network 115 to detect whether the transactions are fraudulent and therefore indicate whether user credentials have been stolen. When server 130 detects an event that threatens the security of network 115, server 130 may record the event in an internal log 160. Over time, server 130 may write its internal log 160 to first database 120 and second database 125. In particular embodiments, first database 120 and second database 125 may both be non-relational databases. In some embodiments, first database 120 may be a short-term database and second database 125 may be a long-term database. A short-term database may store information for a limited period of time after which that information is cleared and/or flushed from the short-term database. In particular embodiments, first database 120 is flushed periodically. A long-term database may store information for an indefinite amount of time. As a result, a short-term database may be useful to track events that occurred recently whereas a long-term database may be useful to track events across all time.

To verify that server 130 is operating appropriately, the information in internal log 160 may be compared with information in first database 120 and second database 125. If the information matches, then it is an indication that server 130 is operating appropriately. If there are any mismatches or if internal log 160 contains any errors, then it is an indication that server 130 is not operating appropriately. However, comparing information in internal log 160 with information in first database 120 and second database 125 presents challenges that make the verification process difficult. For example, the information in internal log 160 may be presented in a different format than the information stored in second database 125. As another example, first database 120 and second database 125 may store information in different formats. As a result, comparing information between and amongst internal log 160, first database 120, and second database 125 may waste excessive processor and memory resources of a computer tasked with comparing the information and may tie up excessive network bandwidth. For example, first database 120 may be a Cassandra database and second database 125 may be a Hadoop database, which one or more may store information in different formats from each other and from log 160. As a result, comparing information with information in log 160 may consume excessive processing and memory resources and network bandwidth because the information cannot be directly compared when presented in different formats. For example, a parser may compare individual elements of information in first database 120 with every individual element of information in second database 125 until a match is found. As another example, a parser may compare individual elements of information in second database 125 with elements in log 160 until a match is found. Such parsing and comparing expends excessive processor, memory, and network resources. Therefore, maintaining the security of network 115 presents a problem inherent to computers and computer technology.

Test tool 135 may be used to simplify the verification process. As illustrated in FIG. 1, test tool 135 includes a processor 140 and a memory 145. This disclosure contemplates processor 140 and memory 145 being configured to perform any of the tasks of test tool 135 disclosed herein.

Processor 140 is any electronic circuitry, including, but not limited to microprocessors, application specific integrated circuits (ASIC), application specific instruction set processor (ASIP), and/or state machines, that communicatively couples to memory 145 and controls the operation of recycling tool 130. Processor 140 may be 8-bit, 16-bit, 32-bit, 64-bit or of any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory to perform any of the functions described herein. Processor 140 controls the operation and administration of recycling tool 130 by processing information received from network 115, device(s) 110, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile or non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

Test tool 135 may receive a message 150 from first database 120, a second message 155 from second database 125, and the internal log 160 from server 130. First message 150 may include information stored in first database 120. Second message 155 may include information stored in second database 125. Internal log 160 may indicate the various events and actions logged by server 130. As discussed previously, information in message 155 and information in log 160 may be presented in different formats therefore making comparison difficult. Test tool 135 may transform second message 155 to the same format. For example, test tool 135 may transform second message 155 into a JavaScript object notation message 170.

In particular embodiments, first message 150 includes a name of a first column of a table in first database 120, a type of the first column, and a plurality of values stored in the first column. In some embodiments, second message 155 includes a name of a second column of a table in the second database 125, a type of the second column, and a plurality of values stored in the second column. For example, first message 150 may include a column from a table listing fraudulent transactions stored in first database 120. The column may be of a date type and may include the dates when fraudulent transactions were detected.

Test tool 135 may then compare first message 150 and JavaScript object notation message 170 with information stored in log 160. Based on those comparisons, test tool 135 may determine whether the information stored in first database 120 and the information stored in second database 125 is consistent with information stored in log 160. Test tool 135 may then create and/or communicate a message 175 indicating whether the comparison resulted in a match, a mismatch, or an error. Based on that message, users 105 of test tool 135 may determine whether server 130 is operating appropriately.

In particular embodiments, by using test tool 135 the security of network 115 may be improved by verifying the operation of server 130. For example, test tool 135 may reveal that server 130 is not detecting security events appropriately. As a result, remedial action may be taken to improve the operation of server 130 and to improve the security of network 115. Furthermore, test tool 135 may be used to maintain the security of network 115. For example, test tool 135 may be used to determine whether server 130 is operating appropriately. In certain embodiments, test tool 135 reduces the amount of processor and memory resources expended to compare information stored in first database 120, second database 125, and log 160 by translating the information into a common format and then comparing the information. Test tool 135 also reduces the network bandwidth consumption used in comparing the information by reducing the amount of information communicated across network 115. The operation of test tool 135 will be discussed in more detail using FIGS. 2 and 3.

Although this disclosure describes test tool 135 transforming messages received from second database 125 into JavaScript Object Notation, it is contemplated that test tool 135 may also transform messages from first database 120 into JavaScript Object Notation. For example, test tool 135 may receive a message from first database 120, transform that message into JavaScript Object Notation, and compare that JavaScript Object Notation message with log 160.

FIG. 2 illustrates the test tool 135 of the system 100 of FIG. 1. As illustrated in FIG. 2, test tool 135 includes a connection engine 200, a transformation engine 205, a validation engine 210, and a messaging engine 175. This disclosure contemplates test tool 135 implementing any of connection engine 200, transformation engine 205, validation engine 210, and messaging engine 175 using processor 140, memory 145, and software executed by processor 140.

Connection engine 200 forms connections with other components of system 100. For example, connection engine 200 may create a connection with one or more of first database 120, second database 125, server 130, and/or devices 110 through network 115. Test tool 135 may receive messages from components of system 100 through the connections created by connection engine 200. An example algorithm performed by connection engine 200 is: communicating a request to a component of system 100 to open a connection, receiving a response from the component acknowledging the request and accepting the connection, opening a connection between test tool 135 and the component of system 100, and receiving an acknowledgement from the component acknowledging the connection.

Transformation engine 205 transforms messages received by test tool 135. For example, transformation engine 205 may receive first message 150 and second message 155 through a connection opened by connection engine 200. Transformation engine 205 may then transform second message 155 into JavaScript object notation message 170. An example algorithm performed by transformation engine 205 is: receiving a message, analyzing the contents of the message to determine whether the message should be transformed, and transforming the message to a JavaScript object notation message. The transformation process may include using a parser to parse various components of the message and translating those parsed components into JavaScript object notation. As discussed above, transformation engine 205 may also transform message 150 into JavaScript Object Notation before comparing with log 160.

Validation engine 210 compares messages with log 160. For example, validation engine 210 may compare first message 150 with log 160. As another example, validation engine 210 may compare JavaScript object notation message 170 with log 160. An example algorithm for the comparison may include the use of a parser to parse various elements of first message 150 and JavaScript object notation message 170. Then these parsed elements are compared to elements of log 160 to determine whether that element matches an element of log 160. The example algorithm may also include a check scheme that checks whether the parsed element contains an error. The check scheme may also determine whether the element of log 160 contains an error.

In particular embodiments, validation engine 210 can request second message 155 by sending a Hive query to second database 125. An example algorithm followed by validation engine 210 is: determining that second message 155 should be requested, forming a Hive query, and communicating the Hive query to second database 125.

Messaging engine 175 creates and communicates message 175 that indicates the results of validation engine 210. For example, if validation engine 210 determines that log 160 contains an element that does not match any elements in first message 150 or JavaScript object notation message 170 or vice versa, messaging engine 175 may create and communicate message 175 that indicates the mismatch. As another example, if validation engine 210 determines that log 160, first message 150, or JavaScript object notation message 170 contains an error, then messaging engine can create and communicate message 175 that indicates the error. Furthermore, if validation engine 210 determines that there are no errors and that the information matches, then messaging engine 175 can create and communicate message 175 that indicates the match. An example algorithm performed by messaging engine 175 is: receiving the results of the comparison from validation engine 210, analyzing the results to determine the contents of message 175, creating space in memory for message 175, populating message 175 with the results of the comparison from validation engine 210, and communicating message 175 through network 115 to device 110.

FIG. 3 is a flowchart illustrating a method 300 for testing the security of a network using the system 100 of FIG. 1. In particular embodiments, test tool 135 performs method 300. By performing method 300 test tool 135 may improve and/or maintain the security of network 115 by ensuring that a server that detects security events is functioning appropriately. As a result, test tool 135 reduces the amount of processor and memory resources used to maintain the security of network 115. Additionally, test tool 135 reduces the amount of network bandwidth used to maintain the security of network 115.

Test tool 135 begins by connecting to a first non-relational database, a second non-relational database, and a server in step 305. In step 310, test tool 135 receives a first message and a second message. Test tool 135 transforms the second message into JavaScript object notation in step 315.

In step 320, test tool 135 compares the first message and the JavaScript object notation message with a server log to determine whether information in the first message and the JavaScript object notation message matches information in the server log. In step 325, test tool 135 determines whether there was a match. If there was not a match, test tool 135 communicates a message indicating a mismatch in step 330. If there was a match, test tool 135 communicates a message indicating the match in step 335.

Modifications, additions, or omissions may be made to method 300 depicted in FIG. 3. Method 300 may include more, fewer, or other steps. For example, steps may be performed in parallel or in any suitable order. As another example, test tool 135 may transform first message into JavaScript Object Notation before comparing with the server log. While discussed as test tool 130 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A test tool comprising:
a hardware processor;
a connection engine implemented by the hardware processor and configured to connect to a first non-relational database, a second non-relational database, and a server, the first non-relational database is flushed periodically;
a transformation engine implemented by the hardware processor and configured to:

receive a first message from the first non-relational database, the first message comprises a name of a first column of a table in the first non-relational database, a type of the first column, and a first plurality of values stored in the first column, a value of the first plurality of values indicating whether a network intrusion is detected;
receive a second message from the second non-relational database, the second message comprises a name of a second column of a table in the second non-relational database, a type of the second column, and a second plurality of values stored in the second column; and
transform the second message into a JavaScript Object Notation message;
a validation engine implemented by the hardware processor and configured to:
compare the first message with a server log stored on the server;
determine, based on the comparison of the first message with the server log, that the server log includes a value that does not match any of the first plurality of values stored in the first column;
compare the JavaScript Object Notation message with the server log;
determine, based on the comparison of the JavaScript Object Notation message with the server log, that the JavaScript Object Notation message includes an error;
in response to the determination that the server log includes a value that does not match any of the first plurality of values stored in the first column and the determination that the JavaScript Object Notation message includes the error, determine that a security tool is malfunctioning;
a messaging engine implemented by the hardware processor and configured to communicate a message indicating that the server log includes a value that does not match any of the first plurality of values stored in the first column and that the second message contains the error, wherein a remedial action is performed in response to the message to repair the malfunctioning security tool.

2. The test tool of claim 1, wherein the first non-relational database is a Cassandra database and the second non-relational database is a Hadoop database.

3. The test tool of claim 1, wherein the validation engine is further configured to request the second message by sending a Hive query to the second non-relational database.

4. A method comprising:
connecting, by a hardware processor, to a first non-relational database, a second non-relational database, and a server, the first non-relational database is flushed periodically;
receiving, by a hardware processor, a first message from the first non-relational database, the first message comprises a name of a first column of a table in the first non-relational database, a type of the first column, and a first plurality of values stored in the first column, a value of the first plurality of values indicating whether a network intrusion is detected;
receiving, by a hardware processor, a second message from the second non-relational database, the second message comprises a name of a second column of a table in the second non-relational database, a type of the second column, and a second plurality of values stored in the second column;

transforming, by a hardware processor, the second message into a JavaScript Object Notation message;

comparing, by a hardware processor, the first message with a server log stored on the server;

determining, based on the comparison of the first message with the server log, that the server log includes a value that does not match any of the first plurality of values stored in the first column;

comparing, by a hardware processor, the JavaScript Object Notation message with the server log;

determining, based on the comparison of the JavaScript Object Notation message with the server log, that the JavaScript Object Notation message includes an error;

in response to the determination that the server log includes a value that does not match any of the first plurality of values stored in the first column and the determination that the JavaScript Object Notation message includes the error, determining that a security tool is malfunctioning;

communicating, by a hardware processor, a message indicating that the server log includes a value that does not match any of the first plurality of values stored in the first column and that the second message contains the error, wherein a remedial action is performed in response to the message to repair the malfunctioning security tool.

5. The method of claim 4, wherein the first non-relational database is a Cassandra database and the second non-relational database is a Hadoop database.

6. The method of claim 4, further comprising requesting the second message by sending a Hive query to the second non-relational database.

7. A system comprising:
a first non-relational database that is flushed periodically;
a second non-relational database;
a server;
a security tool; and
a test tool comprising a hardware processor configured to implement:
  a transformation engine configured to:
    receive a first message from the first non-relational database, the first message comprises a name of a first column of a table in the first non-relational database, a type of the first column, and a first plurality of values stored in the first column, a value of the first plurality of values indicating whether a network intrusion is detected;
    receive a second message from the second non-relational database, the second message comprises a name of a second column of a table in the second non-relational database, a type of the second column, and a second plurality of values stored in the second column; and
    transform the second message into a JavaScript Object Notation message;
  a validation engine configured to:
    compare the first message with a server log stored on the server;
    determine, based on the comparison of the first message with the server log, that the server log includes a value that does not match any of the first plurality of values stored in the first column;
    compare the second JavaScript Object Notation message with the server log;
    determine, based on the comparison of the JavaScript Object Notation message with the server log, that the JavaScript Object Notation message includes an error;
    in response to the determination that the server log includes a value that does not match any of the first plurality of values stored in the first column and the determination that the JavaScript Object Notation message includes the error, determine that a security tool is malfunctioning;
  a messaging engine configured to communicate a message indicating that the server log includes a value that does not match any of the first plurality of values stored in the first column and that the second message contains the error, wherein a remedial action is performed in response to the message to repair the malfunctioning security tool.

8. The system of claim 7, wherein the first non-relational database is a Cassandra database and the second non-relational database is a Hadoop database.

9. The system of claim 7, wherein the validation engine is further configured to request the second message by sending a Hive query to the second non-relational database.

* * * * *